(No Model.) 4 Sheets—Sheet 1.

J. K. LEONARD & J. O. BENDER.
TRANSPLANTER.

No. 426,455. Patented Apr. 29, 1890.

Witnesses
H. P. Denison
F. T. Denison

John K. Leonard  
John O. Bender  } Inventors

By their Attorneys
Smith & Denison (No Model.) 4 Sheets—Sheet 2.
J. K. LEONARD & J. O. BENDER.
TRANSPLANTER.
No. 426,455. Patented Apr. 29, 1890.
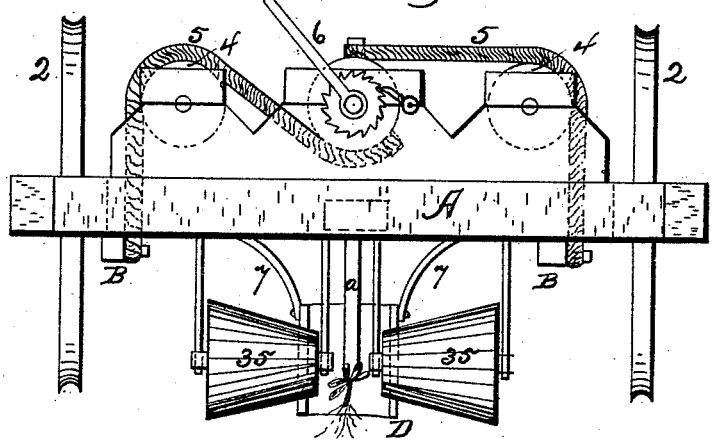
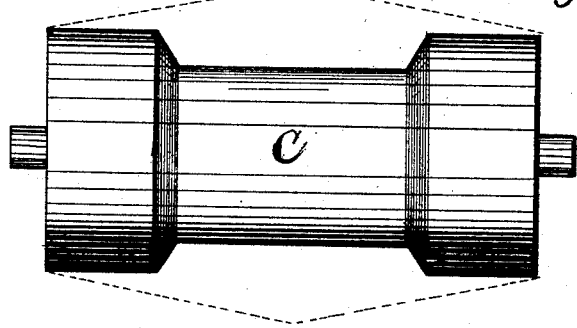

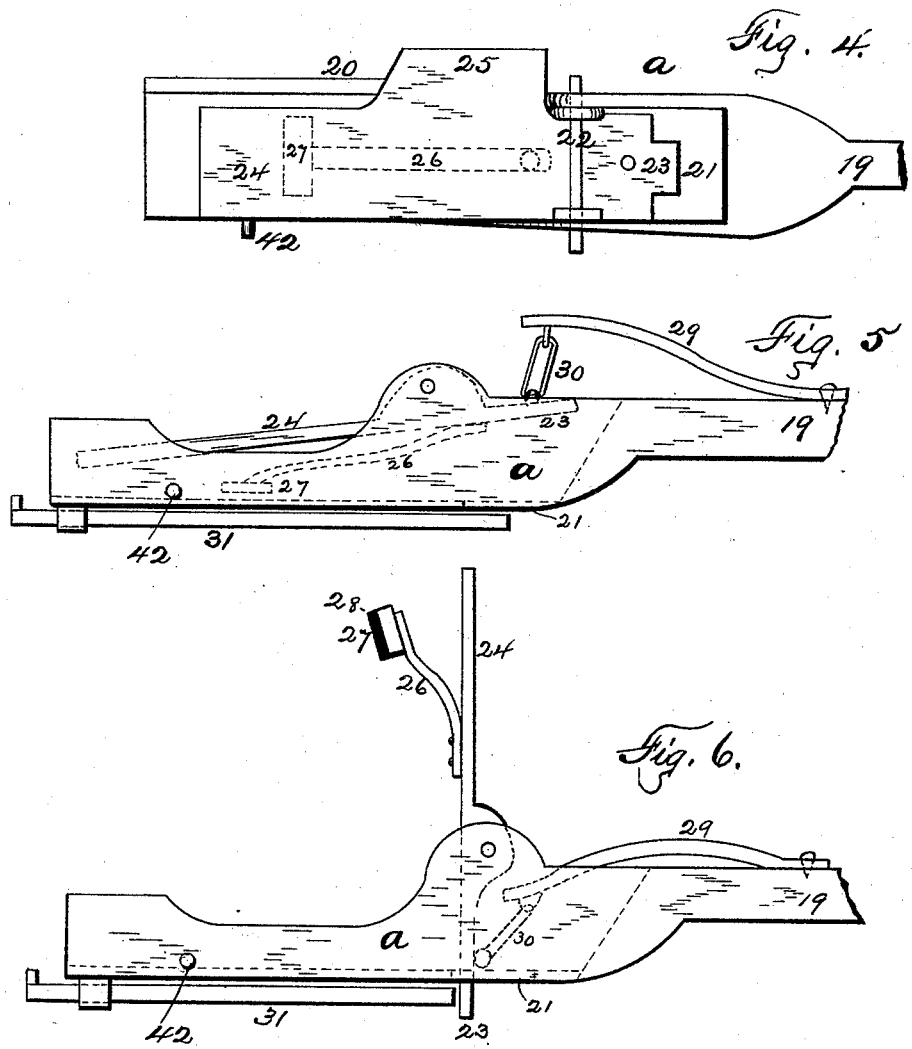

(No Model.) 4 Sheets—Sheet 4.
J. K. LEONARD & J. O. BENDER.
TRANSPLANTER.
No. 426,455. Patented Apr. 29, 1890.
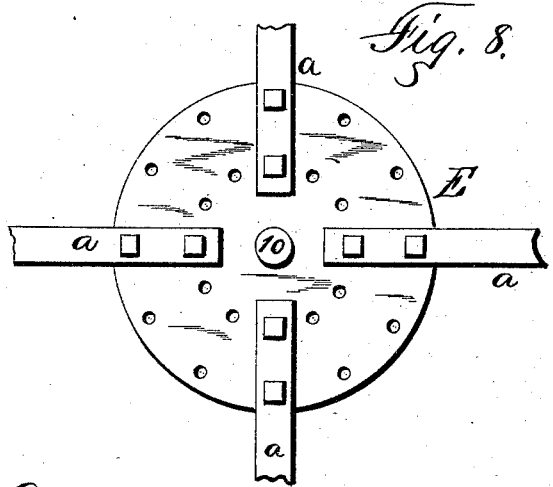
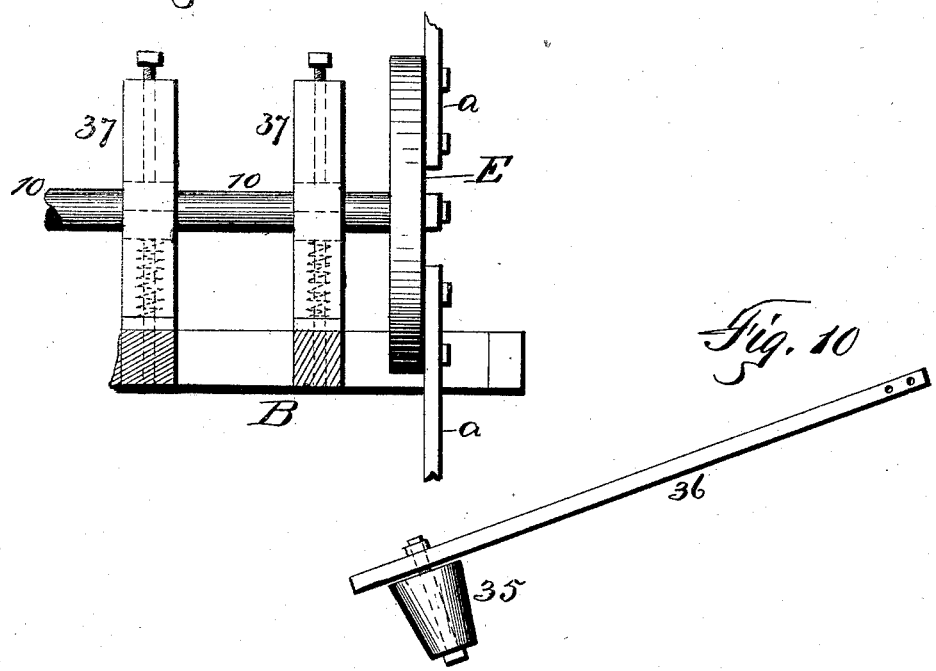
Witnesses
H. P. Denison
F. T. Denison
John K. Leonard
John O. Bender
Inventors
By their Attorneys
Smith & Denison

UNITED STATES PATENT OFFICE.

JOHN K. LEONARD, OF BIG FLATS, AND JOHN O. BENDER, OF FAYETTEVILLE, NEW YORK.

TRANSPLANTER.

SPECIFICATION forming part of Letters Patent No. 426,455, dated April 29, 1890.

Application filed November 29, 1889. Serial No. 331,883. (No model.)

*To all whom it may concern:*

Be it known that we, JOHN K. LEONARD, of Big Flats, Chemung county, and JOHN O. BENDER, of Fayetteville, Onondaga county, in the State of New York, have invented new and useful Improvements in Transplanters, of which the following, taken in connection with the accompanying drawings, is a full, clear, and exact description.

Our invention relates to the construction of machines and apparatus for setting or transplanting tobacco, celery, cabbage, or other plants in rows with uniform spacing between the plants.

Our object is to produce such a machine to be drawn by horses in which we combine a ridging or furrowing roller, a plow for making the drill to receive the plants, a plant holder and dropper, and rollers for compressing the earth around the plants after they are dropped into the drill, and mechanism for watering the plants successively as they are set, the plow, plant-setter, and watering devices being mounted in or upon a swing-frame provided with means for raising or lowering it, in order to regulate the depth of the drill and maintain the contiguity of the plant-setter in the plow and the watering-nozzle to the plant-setter.

Our invention consists in the several novel features of construction and operation hereinafter described, and specifically set forth in the claims annexed.

It is constructed as follows, reference being had to the accompanying drawings, in which—

Figure 1:
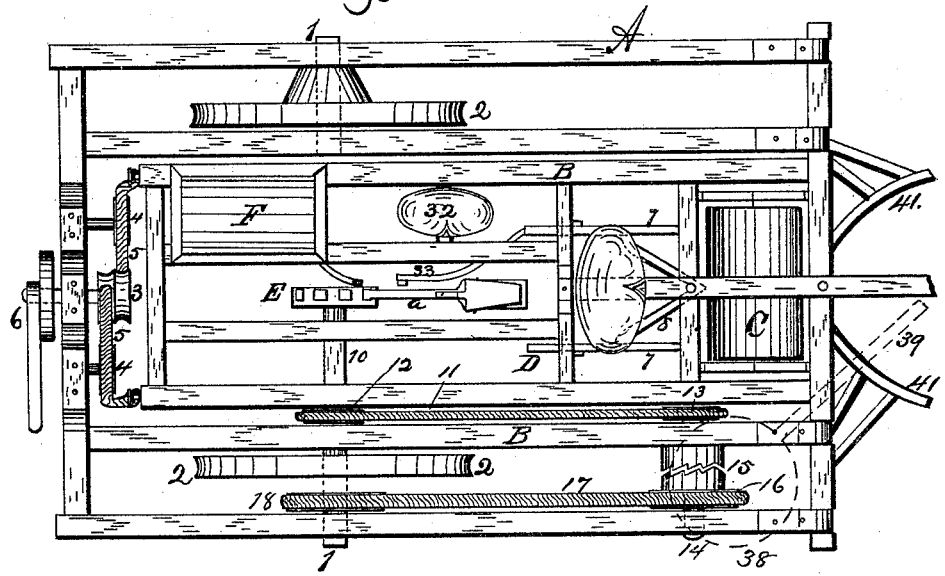
Figure 2:
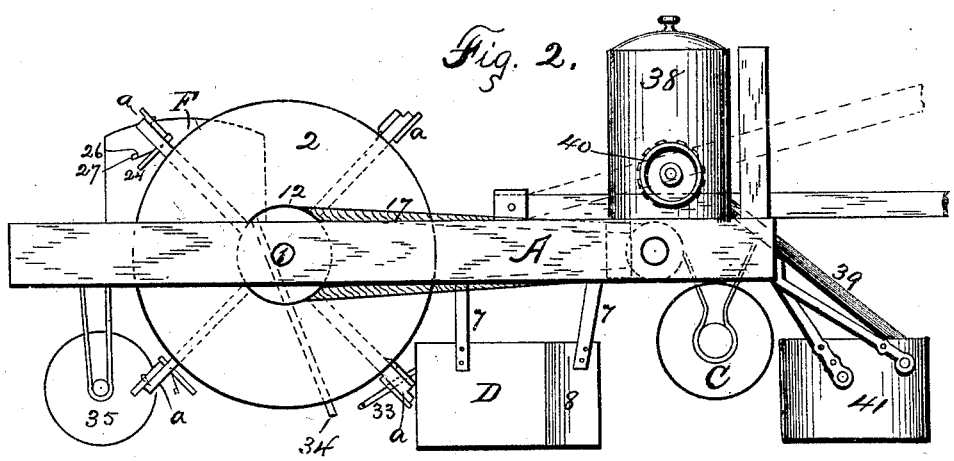

Figure 1 is a top plan view of the machine. Fig. 2 is a side elevation thereof. Fig. 3 is a rear elevation of the same. Fig. 4 is a top plan view of the plant holder and dropper with the top spring removed. Fig. 5 is a side elevation of the dropper complete and closed. Fig. 6 is a like view of the same opened after dropping a plant and ready to receive another. Fig. 7 is an elevation of a ridging-roller concaved centrally for the purpose of forming a ridge, and also showing a convex outer surface in dotted lines for purpose of forming a groove in the earth. Fig. 8 is a front elevation of a part of the dropper-wheel, in which a face-plate provided with bolt-holes in radial lines is used to receive the bolts which secure the dropper-arms and is used in place of a mortised hub. Fig. 9 is an elevation showing the dropper-wheel shaft mounted in journal-boxes above the frame and means for adjusting the shaft vertically. Fig. 10 is an elevation of one of the pressure-rollers mounted upon a long spring-arm.

A is the main frame, mounted upon the sectional main axle 1, which carries the wheels 2. These wheels are constructed with concaved peripheries, in order to prevent the machine from slipping out of line upon a side hill.

B is the auxiliary frame, pivotally connected to the front bar of the main frame and supported to the rear end from the main frame by the mechanism consisting of the double windlass 3, pulleys 4, ropes or chain 5, and ratchet-lever 6, and this end of the frame is raised or lowered by rotation of the windlass and winding up or unwinding the ropes, which are connected to the windlass and to the frame, the pawls and ratchet holding the frame to the point desired.

In the front end of the frame B, or in the bracket-bearings below it and secured to it, we mount a roller C, which levels down the surface of the ridge and forms its sides. In rear of this roller we place our plow D, dependent from the frame and supported by bars 7 secured thereto. This plow is constructed with a wedging-point 8 and side wings 9 back thereof, the point forming the drill for the plants and the wings holding the dirt back, for the reason hereinafter described.

E is the planting-wheel, consisting of a hub provided with peripheral mortises, in which are removably mounted the arms or spokes which carry upon their outer ends the plant holders and droppers *a*, or we can use a face-plate having series of radial holes to receive the bolts which secure the droppers. This wheel or face-plate is mounted upon and rotated by the shaft 10, which is actuated by the belt 11, passing around the pulleys 12 and 13, the pulley 13 being supported by the shaft 14 when the clutch 15 is engaged, and the clutch-pulley 16 is actuated by the belt 17 and the pulley 18 upon the axle 1, which revolves the wheel 2.

The plant holder and dropper *a* consists of a shank 19, carrying a box 20, open at its outer end and mounted, as at 21, and a cover pivotally mounted in the walls of the box, as at 22, and having a rearward projection 23 and outer projection 24 and a side projection 25, extending out beyond the wall of the box on that side, a spring 26, secured to the under side of the cover, having a transverse bar 27 upon its outer end, the outer face of which may be covered with a felt cushion 28, a spring 29, secured to the shank 19 and having its free end connected by a link 30 to the rear part of the cover, and a side bar 31, mounted in guides under the bottom of the box and so arranged that when the cover is open its end engages with the rear end of the side, which then projects beyond the outer end of the box, and so that when the slide is pushed back it will throw the cover off from the center, and then the spring 29 will throw the cover down upon the box, the bar 27 being in contact with the bottom thereof.

The operator sits upon the seat 32, and as each open plant-holder comes around to him a plant is placed in the box with its root in the open end, and at the same time throws the cover down, and the bar 27 catches the plant and holds it until the flange 24 of the cover encounters the trip 33, the point of which catches under the cover and pulls it back, opening the box, and the plant drops into the drill just between the rear ends of the plow-wings, or at the point where the dirt rolling back into the drill will cover the roots of the plants, and then the rear rollers 35, of frusto-conical form, will press and squeeze the dirt inward toward and around the plant, and just after the plant is dropped a jet of water is discharged from the tank F through the pipe 34 onto the plant and around it.

The operation of the catch-bar 27 throws the box-cover back just over the center, so that the cover will stand open against the tension of the cover-spring until it closes, when another plant is placed in the holder-box, as above described.

The mortises in the dropper-hub are close together around its periphery, so that we can regulate the distance between the planes by varying the number of droppers—as, for instance, to increase the distance we reduce the number of droppers, and to diminish the distance we increase the number of droppers, always arranging them equidistant from each other, and thus we can set plants from a few inches apart up to several feet. We can also vary the space between the plants by increasing or decreasing the speed of the rotation of the plant-holders by changing the size of the drive-pulley upon the dropper-wheel shaft. We also mount the rollers 35 upon long bars 36, of spring metal, so that the roller always bears with a yielding pressure upon the ground, so that it will more readily pass over stones or other obstructions, and by canting the roller to one side it will act more as a wedge to squeeze the dirt in toward the plant. We also show in Fig. 9 the dropper-shaft mounted in journal-boxes 37, which can be vertically adjusted to vary the distance the droppers enter the ground by means of the spring shown in dotted lines and by the set-screws. Of course this shaft can be adjusted by other means which are equivalents of the means shown, and we do not limit ourselves to those shown and described.

At 38 we show a phosphate-holder provided with a discharge-pipe 39, and also with any ordinary stirring mechanism within it, actuated by the pulley 40. This pipe 39 discharges the fertilizer in between the ridging-plows 41, which are mounted in front of the rollers C and supported below the main frame, and the roller C when concaved shapes and forms the ridge.

The pin 42 on the side of the plant-holder *a* is arranged and adapted to engage with the gate of any ordinary faucet in which the gate is closed by a spring, opening such gate while in engagement therewith, and thus discharging water directly upon the roots of the plants, and closing as soon as the pin is out of engagement, cutting off the flow of water, and thus only discharging the water upon the plants.

What we claim as our invention, and desire to secure by Letters Patent, is—

1. The combination, with the frame, the beveling-roller mounted under the front end thereof, the plow mounted in rear of the roller, and the plant-dropper in rear of the plow, of squeezing-rollers mounted upon the free ends of long spring-bars secured to the frame.

2. The combination, with the frame, the beveling-roller mounted under the front end thereof, the plow mounted in rear of the roller, and the plant-dropper in rear of the plow, of spring-bars secured to the frame and squeezing-rollers mounted upon the free ends of the bars and canted thereon, as set forth.

3. A rotating plant-dropper consisting of a hub mortised to receive the ends of the dropper-arms, and dropper-arms removably inserted into the mortises and carrying plant-holders upon their outer ends, consisting of a box with a spring-cover, as set forth.

4. The combination, with the dropper-arm, of a box mounted thereon, open in its front end and having a spring-actuated cover pivotally mounted between its sides, and a slide mounted beneath the box and adapted to engage with the inner end of the cover, as set forth.

5. The combination, with the dropper-arm, of a box mounted thereon, open in its outer end and having a spring-actuated cover pivotally mounted between its sides, and a spring-grip upon the inner side of the cover, and a slide mounted beneath the box and adapted to engage with the inner end of the cover, as set forth.

6. The combination, with the dropper-box open in front, of a spring-actuated cover pivotally mounted between its sides, a spring-bar secured beneath the cover and having a transverse head, and a slide mounted beneath the box and adapted to engage with the inner end of the cover, as set forth.

7. The combination, with the dropper-wheel hub and means for rotating it, of multiple dropper-arms removably inserted into the mortise in the hub, each carrying a plant holder and dropper consisting of a box, a spring-actuated and pivotally-mounted cover having on one edge a flange projecting beyond the side of the box, and a trip adapted to engage with the cover-flange to open the cover, as set forth.

8. The combination, with the plow suspended beneath the frame and adjustable vertically, of a rotating dropper-wheel having multiple radial arms removably mounted in the hub and carrying boxes having spring-actuated covers overlapping the box and a strip adapted to engage with the cover, as set forth.

9. The combination, with the plow suspended from the frame and adjustable vertically, of a rotating dropper-wheel carrying multiple droppers consisting of arms, boxes on the arms having spring-actuated overlapping covers, and a trip engaging with the covers successively to open them, a water-tank, a pipe, and means to discharge the water upon the dropped plant, as set forth.

10. The combination, with the plow suspended from the frame and the rotating dropper-wheel mounted therein, of the water tank and pipe discharging water upon the dropped plant, with the frusto-conical pressure-rollers suspended from the frame, as set forth.

11. The combination, with the cover of the dropper-box and its actuating-spring, of the slide mounted beneath the box and engaging with the rear end of the cover when open, as set forth.

In witness whereof we have hereunto set our hands this 6th day of November, 1889.

JOHN K. LEONARD.
JOHN O. BENDER.

In presence of—
  H. P. DENISON,
  F. T. DENISON.